(12) United States Patent
Neeld et al.

(10) Patent No.: US 6,669,413 B1
(45) Date of Patent: Dec. 30, 2003

(54) DRILL LOCATOR FOR LOCATING HOLES TO BE DRILLED IN TUBES

(75) Inventors: James N. Neeld, Tiverton, RI (US); Thomas J. Gamache, Fall River, MA (US); Wayne Rogers, Tiverton, RI (US)

(73) Assignee: Genlyte Thomas Group LLC, Louisville, KY (US)

( * ) Notice: Subject to any disclaimer, the term of this patent is extended or adjusted under 35 U.S.C. 154(b) by 238 days.

(21) Appl. No.: 09/981,615

(22) Filed: Oct. 16, 2001

(51) Int. Cl.[7] .............................................. B23B 49/02
(52) U.S. Cl. ................. 408/79; 408/115 B; 408/241 B; 408/115 R
(58) Field of Search ................................ 408/72 B, 79, 408/115 R, 115 B, 241 B

(56) References Cited

U.S. PATENT DOCUMENTS

| | | | |
|---|---|---|---|
| 190,042 A | * | 4/1877 | Hurd .............................. 408/97 |
| 3,713,747 A | * | 1/1973 | Haselmo .................. 408/115 R |
| 3,752,593 A | | 8/1973 | Fitzgerald et al. |
| 4,213,477 A | | 7/1980 | Velasquez |
| 4,574,443 A | | 3/1986 | Persak et al. |
| 4,669,926 A | | 6/1987 | Wilcox, Jr. |
| 5,051,044 A | | 9/1991 | Allen |
| 2002/0150435 A1 | * | 10/2002 | Beattie .................... 408/115 R |

\* cited by examiner

*Primary Examiner*—Daniel W. Howell
(74) *Attorney, Agent, or Firm*—Middleton Reutlinger

(57) ABSTRACT

A hole-locating device for use in the field for locating and assisting in the drilling of holes in cut ends of tubing includes a body having an outer wall with a plurality of outer flat surfaces and an inner cylindrical wall spaced from said outer wall. The outer wall having a pair of aligned openings on opposite sides of the side wall and the inner wall having a pair of openings spaced 180° apart, wherein the openings in the outer wall and the openings in the inner wall are in alignment. In cutting aligned openings in a tube, the tube is received within an open end of the body in the spacing between the inner wall and the outer wall and a drill bit is placed in adjacent openings in the outer wall and inner wall for receiving a drill bit therein.

8 Claims, 2 Drawing Sheets

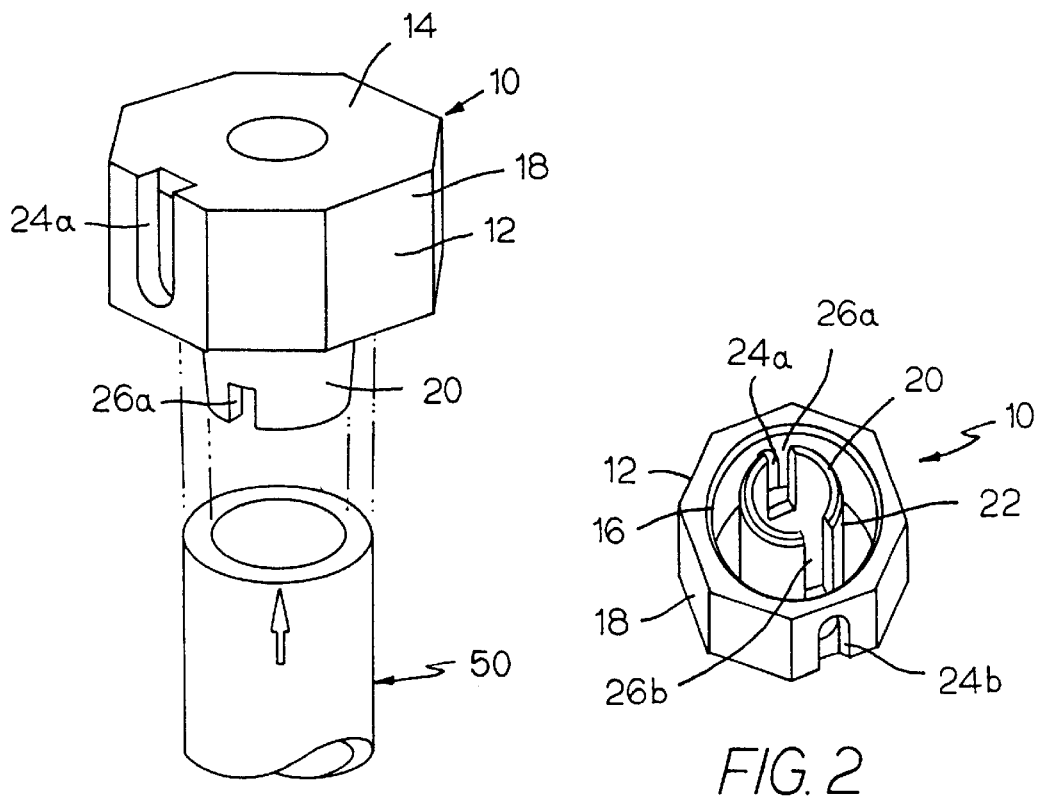
FIG. 1
FIG. 2
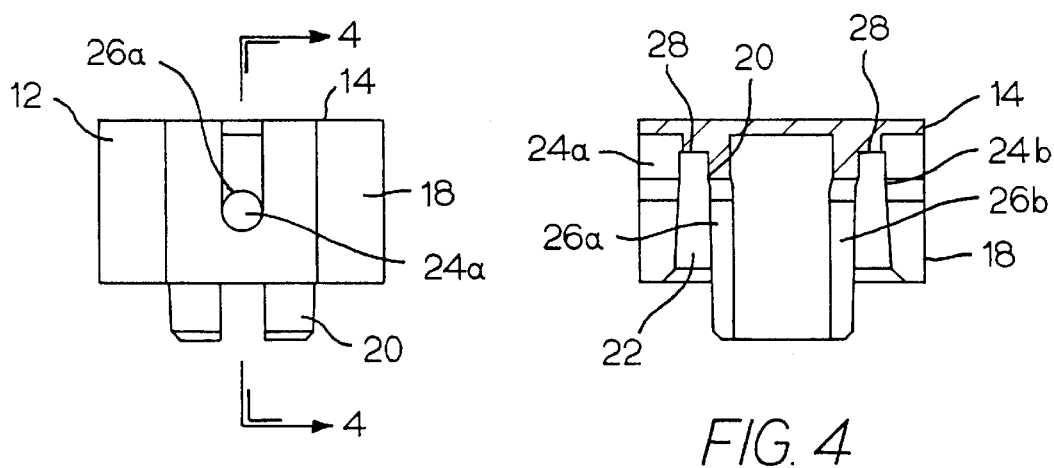
FIG. 3
FIG. 4

DRILL LOCATOR FOR LOCATING HOLES TO BE DRILLED IN TUBES

BACKGROUND OF THE INVENTION

This invention relates to a drilling hole locator for tubes and more particularly to a device attachable to an end of a cut tube for providing precise location for holes to be drilled in the tube.

In many instances, when pipe or tubing is cut in the field, it is necessary to provide for new holes to be placed in the side walls of the tubing. It is common practice to initially drill a pilot hole in the tube, and then a larger hole is drilled with an appropriately sized drill bit. However, drilling of holes in cylindrical objects presents a number of problems, particularly as to the precision in forming the holes. In many instances, with the tube being cylindrical in shape, it has been common practice to provide clamping arrangements that are generally very crude in holding the tubing so the holes can be drilled, and precision-formed holes are difficult to obtain. For more sophisticated equipment for holding the tubing steady and aligning the drill for precision hole formation, the equipment has been relatively large, cumbersome and costly.

SUMMARY OF THE INVENTION

It is an object of the present invention to provide a relatively small device that allows holes to be put into the side wall of a tube at a preselected distance from a cut end of the tube.

It is another object of the present invention to provide a relatively small device for alignment of the holes to be drilled in the side wall of a tube.

It is an even further object of the present invention to provide a hole locating device that allows users in the field to cut tubing to short lengths and be capable of drilling a required hole in an appropriate position.

It is also an object of the present invention to provide a hole-locating device that fits over the end of a cut piece of tubing, wherein the outer wall of the device has relatively flat sides. This would enable the device to be held in a clamping arrangement, with at least one pair of parallel flat sides having aligned slots or openings therein to which a drill bit may be passed in drilling a pair of aligned holes in a tube.

More particularly, the present invention provides a drill locator for locating drilling holes in tubes, which includes a body having a top end and an opposed bottom open end. The body includes an outer wall having at least two parallel opposed sides which extend downwardly from the top end to the opposed bottom open end and an inner wall spaced inwardly from the outer wall. The spacing between the outer wall and the inner wall define a tube end receiving section. The outer side wall and the inner wall each have two openings therein spaced 180° apart, all four of the openings being in alignment.

These and other objects of the present invention will become apparent to those skilled in the art upon consideration of the preferred embodiment described hereinafter.

BRIEF DESCRIPTION OF THE DRAWINGS

FIG. 1 is an exploded view of the device of the present invention shown receiving an end of a tube into which holes are to be drilled;

FIG. 2 is a perspective view of a preferred device of the present invention;

FIG. 3 is a front view of a device of the present invention;

FIG. 4 is a sectional view of the device taken along lines 4—4 in FIG. 3;

DETAILED DESCRIPTION OF THE PREFERRED EMBODIMENT

As shown in FIG. 1, a drill locator 10 of the present invention is provided to receive the cut end of a tube, a pipe or an electrical conduit, or the like, as indicated by the numeral 50.

Figure 5:
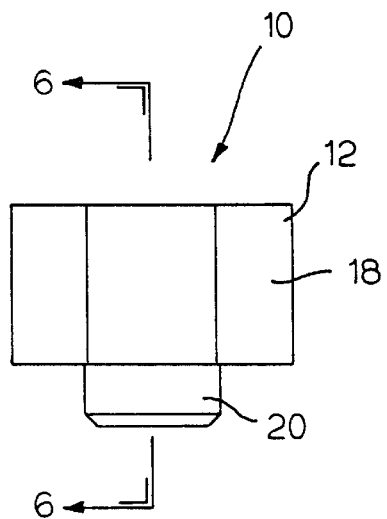
FIG. 5 is a side view of the device of FIG. 1.
Figure 6:
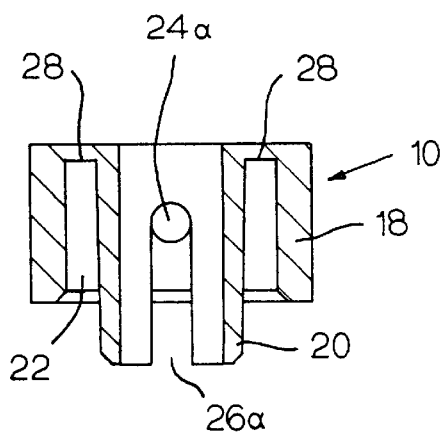
FIG. 6 is a sectional view taken along line 6—6 of FIG. 5.
Figure 7:
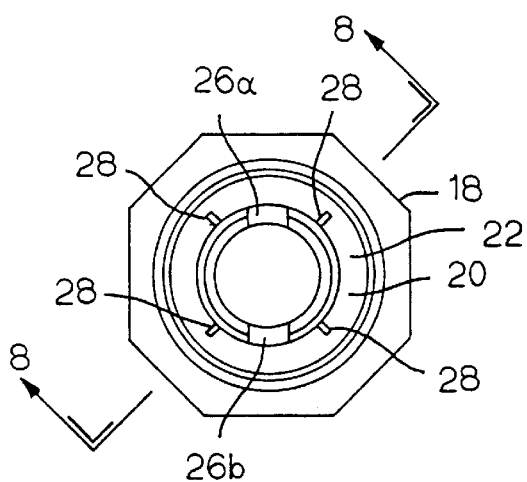
FIG. 7 is a bottom view of the device of the present invention.
Figure 8:
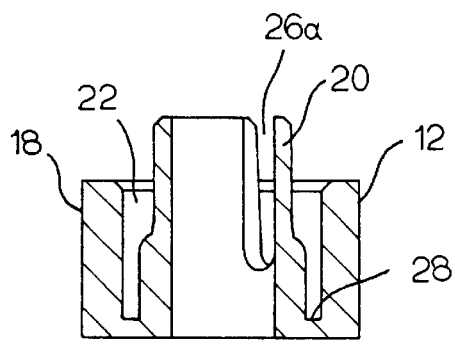
FIG. 8 is a sectional view taken along lines 8—8 of FIG. 7.

As shown in FIGS. 1–8, the drill locator 10 is provided with a body 12, which generally includes a plurality of flat sides or sections on the outer surface of the side wall 18 that may be easily held in any desired clamping arrangement (not shown) in the field. In the preferred embodiment, the outer side wall 18 is of hexagonal configuration, but it is realized that other configurations may be utilized as long as there are at least two sides of the outer side wall 18 in parallel to be received within a selected clamp. The body 12 is also provided with a top wall 14 and an opposed open bottom end 16, the bottom end 16 being for receipt of a tubing 50 (FIG. 1). The outer side wall 18 is provided with a pair of aligned elongated slots 24a and 24b, which extend downwardly from the top wall 14. Spaced inwardly of the outer wall 18 is a cylindrically shaped inner wall 20 having a pair of elongated slots 26a and 26b which extend upwardly from the bottom open end 20 a preselected distance. The slots 26a and 26b are spaced 180° from each other and are in alignment with the spaced slots 24a and 24b, as best shown in FIG. 4. Furthermore, the upward terminating ends of the slots 26a and 26b, in a preferred embodiment, are arcuate in curvature with the radius of the arc being substantially one-half the width of the slot. Moreover, the lower terminating ends of the slots 24a and 24b are also arcuate in curvature, with the radius of curvature being substantially one-half the width of the slots 24a and 24b. And, the width of the slots 24a, 24b, 26a and 26b are generally the same width and overlap sufficiently to provide ease to install a drill bit into aligned openings 24a and 26a or 24b and 26b, so that the drill bit inserted into 24a, 26a will be in substantial alignment with the opposed slots 24b and 26b. Disposed in the spacing between the inner surface of the outer wall 18 and the outer surface of the inner wall 20 is a tube receiving section 22. The spacing between the walls 18 and 20 generally defines the thickness of the tubing 50 to be received within the tube receiving section 22. Also, in a preferred locator 10 inner wall 20 extends beyond outer wall 18 to provide ease in aligning a tube 50 with the tube receiving section 22.

Also disposed at circumferentially spaced locations along the inner surface of the top wall 14 is a plurality of inwardly extending ribs 28. Inwardly extending ribs 28 provide a grip for the end of the tube 50 to assist in holding the tube 50 in a condition for holes to be cut therein. Generally, the inwardly extending ribs 28 are embedded into the end of the tubing 50 with light taps on the top wall 14 of the drill locator 10.

In the preferred embodiments, elongated slots 24a, 24b, 26a and 26b are shown as the means for locating the holes to be drilled in a tube, but it is realized that circular shaped apertures or openings which are in alignment may also be used without departing from the scope of the present invention.

It is to be understood that various changes can be made by one skilled in the art to the preferred embodiment discussed herein without departing from the scope or spirit of the present invention as set forth in the appended claims.

What is claimed is:

1. A drill locator device for determining the location of holes to be drilled into tubes comprising:

a body having a top end and an opposed open bottom end;

said body having an outer wall extending downwardly from said top end to said opposed open end and an inner wall spaced inwardly from said outer wall, said outer wall and said inner wall defining a tube end receiving section therebetween, said outer wall having two openings therein spaced 180° apart and said inner wall having two openings therein spaced 180° apart, said openings in said inner wall being in axial alignment with said openings in said outer wall.

2. The device of claim 1 including a plurality of inwardly extending ribs disposed on an inner surface of said top wall between said outer wall and said inner wall.

3. The device of claim 1, said inner wall extends beyond said outer wall at said bottom open end.

4. The device of claim 1, said outer wall openings and said inner wall openings being elongated slots.

5. The device of claim 4, said outer wall slots extending from said closed end and said inner wall slots extending from said open end, said inner wall slots and said outer wall slots overlapping sufficiently to provide axially aligned openings to receive a drill bit therein.

6. The device of claim 1, said outer wall having parallel opposed elongated flat surfaces, each of said flat surfaces having one of said openings therein.

7. The device of claim 1, said outer wall comprising a plurality of elongated flat sections.

8. The device of claim 1, said outer wall being of hexagonal configuration and said inner wall being circular.

* * * * *